United States Patent
Rahmathullah et al.

(10) Patent No.: US 12,364,943 B2
(45) Date of Patent: *Jul. 22, 2025

(54) COMPOSITE MEDIA FOR FUEL STREAMS

(71) Applicant: Donaldson Company, Inc., Bloomington, MN (US)

(72) Inventors: Aflal Rahmathullah, Savage, MN (US); Bradly Hauser, Minneapolis, MN (US); Vijay Kapoor, Eagan, MN (US); Mike J. Madsen, Chaska, MN (US); Derek O. Jones, Andover, MN (US); Charles Christ, Deephaven, MN (US)

(73) Assignee: Donaldson Company, Inc., Bloomington, MN (US)

(*) Notice: Subject to any disclaimer, the term of this patent is extended or adjusted under 35 U.S.C. 154(b) by 192 days.

This patent is subject to a terminal disclaimer.

(21) Appl. No.: 18/126,284

(22) Filed: Mar. 24, 2023

(65) Prior Publication Data

US 2023/0233969 A1    Jul. 27, 2023

Related U.S. Application Data

(63) Continuation of application No. 15/739,841, filed as application No. PCT/US2016/039049 on Jun. 23, 2016, now Pat. No. 11,612,843.

(Continued)

(51) Int. Cl.
*B01D 39/16* (2006.01)
*B01D 39/18* (2006.01)
(Continued)

(52) U.S. Cl.
CPC .......... *B01D 39/163* (2013.01); *B01D 39/18* (2013.01); *B01D 39/2024* (2013.01);
(Continued)

(58) Field of Classification Search
None
See application file for complete search history.

(56) References Cited

U.S. PATENT DOCUMENTS 3,283,477 A   11/1966   Kasten
3,288,299 A   11/1966   Paton et al.
(Continued)

FOREIGN PATENT DOCUMENTS

CN     101553660     10/2009
CN     102596862     7/2012
(Continued)

OTHER PUBLICATIONS

"International Preliminary Report on Patentability," for PCT Application No. PCT/US2015/039077 mailed Jan. 12, 2017 (7 pages).
(Continued)

*Primary Examiner* — Clare M Perrin
(74) *Attorney, Agent, or Firm* — Mueting Raasch Group

(57) ABSTRACT

A filter material for use in fuel-water separation has a particle filtration layer and a coalescing layer downstream of, and coupled to, the particle filtration layer. The particle filtration layer is substantially constructed of binder fibers and media fibers. The coalescing layer has at least 70% glass fibers by weight. As another example, a filter material for liquid fuels has a particle filtration layer and a coalescing layer downstream of the particle filtration layer. The particle filtration layer has binder fibers and media fibers and is substantially free of meltblown materials. The ratio of air permeability of the particle filtration layer to air permeability of the coalescing layer ranges from about 3:1 to about 15:1.

20 Claims, 1 Drawing Sheet

Related U.S. Application Data

(60) Provisional application No. 62/185,505, filed on Jun. 26, 2015.

(51) Int. Cl.
  *B01D 39/20* (2006.01)
  *B01D 17/02* (2006.01)

(52) U.S. Cl.
  CPC ...... *B01D 17/02* (2013.01); *B01D 2239/0421* (2013.01); *B01D 2239/065* (2013.01); *B01D 2239/1233* (2013.01); *B01D 2239/1258* (2013.01)

(56) References Cited

U.S. PATENT DOCUMENTS

| | | |
|---|---|---|
| 4,406,787 A | 9/1983 | Sueto et al. |
| 4,740,299 A | 4/1988 | Popoff et al. |
| 5,089,129 A | 2/1992 | Brigman |
| 5,548,893 A | 8/1996 | Koelfgen |
| 5,900,148 A | 5/1999 | Izutani et al. |
| 5,906,737 A | 5/1999 | Hoeppner |
| 6,248,236 B1 | 6/2001 | Hodgkins |
| 6,409,804 B1 | 6/2002 | Cook et al. |
| 6,422,396 B1 | 7/2002 | Li et al. |
| 6,526,741 B2 | 3/2003 | Whitehead et al. |
| 6,620,316 B1 | 9/2003 | Sakraschinsky et al. |
| 6,706,181 B1 | 3/2004 | Baumann et al. |
| 6,716,349 B2 | 4/2004 | Baracchi et al. |
| 6,936,169 B2 | 8/2005 | Baumann et al. |
| 7,156,890 B1 | 1/2007 | Thompson et al. |
| 7,314,497 B2 | 1/2008 | Kahlbaugh et al. |
| 7,326,342 B2 | 2/2008 | Richmond et al. |
| 7,531,018 B2 | 5/2009 | Becker et al. |
| 7,588,615 B2 | 9/2009 | Gillenberg et al. |
| 7,824,550 B2 | 11/2010 | Abreu et al. |
| 7,887,701 B2 | 2/2011 | Schmid et al. |
| 7,938,963 B2 | 5/2011 | Klein et al. |
| 8,017,011 B2 | 9/2011 | Ellis et al. |
| 8,021,457 B2 | 9/2011 | Dema et al. |
| 8,114,291 B2 | 2/2012 | Ellis et al. |
| 8,236,176 B2 | 8/2012 | Fall et al. |
| 8,388,834 B2 | 3/2013 | Roesgen et al. |
| 8,544,657 B2 | 10/2013 | Chen et al. |
| 8,590,712 B2 | 11/2013 | Wieczorek et al. |
| 8,673,138 B2 | 3/2014 | Braunheim |
| 8,833,567 B2 | 9/2014 | Stanfel et al. |
| 8,978,899 B2 | 3/2015 | Ferrer et al. |
| 9,027,765 B2 | 5/2015 | Battenfeld et al. |
| 9,056,268 B2 | 6/2015 | Jones et al. |
| 9,108,125 B2 | 8/2015 | Braunheim |
| 9,162,168 B2 | 10/2015 | Eberle et al. |
| 9,162,174 B2 | 10/2015 | Baseotto |
| 9,320,992 B2 | 4/2016 | Braunheim |
| 9,333,448 B2 | 5/2016 | Braunheim et al. |
| 9,388,384 B2 | 7/2016 | Kim et al. |
| 9,751,030 B2 | 9/2017 | Kreibig et al. |
| 9,810,373 B2 | 11/2017 | Braunheim |
| 10,413,851 B2 | 9/2019 | Wolhowe |
| 11,612,843 B2 * | 3/2023 | Rahmathullah .... B01D 39/2024 210/490 |
| 2002/0157999 A1 | 10/2002 | Baracchi et al. |
| 2005/0023209 A1 | 2/2005 | Clausen et al. |
| 2005/0161386 A1 | 7/2005 | Gustafson et al. |
| 2006/0006109 A1 | 1/2006 | Klein et al. |
| 2006/0053756 A1 | 3/2006 | Hawkins et al. |
| 2006/0054547 A1 | 3/2006 | Richmond et al. |
| 2006/0096932 A1 | 5/2006 | Dema et al. |
| 2006/0156700 A1 | 7/2006 | Maeda et al. |
| 2006/0186031 A1 | 8/2006 | Fick et al. |
| 2006/0277877 A1 | 12/2006 | Shields |
| 2006/0278575 A1 | 12/2006 | Jokschas et al. |
| 2007/0039300 A1 | 2/2007 | Kahlbaugh et al. |
| 2007/0084776 A1 | 4/2007 | Sasur |
| 2007/0240390 A1 | 10/2007 | Becker et al. |
| 2008/0060985 A1 | 3/2008 | Carew |
| 2008/0135469 A1 | 6/2008 | Fremont et al. |
| 2008/0210618 A1 | 9/2008 | Kiedaisch et al. |
| 2009/0008321 A1 | 1/2009 | Tanner et al. |
| 2009/0044702 A1 | 2/2009 | Adamek et al. |
| 2009/0114589 A1 | 5/2009 | Reiland et al. |
| 2009/0200221 A1 | 8/2009 | Hacker et al. |
| 2010/0025317 A1 | 2/2010 | Fall et al. |
| 2010/0044295 A1 | 2/2010 | Honermann et al. |
| 2010/0096304 A1 | 4/2010 | Gaenswein et al. |
| 2010/0252510 A1 | 10/2010 | Godsay et al. |
| 2011/0124941 A1 | 5/2011 | Verdegan et al. |
| 2011/0132816 A1 | 6/2011 | Vasilescu |
| 2011/0198280 A1 | 8/2011 | Jones et al. |
| 2011/0203982 A1 | 8/2011 | Braunheim |
| 2011/0210059 A1 | 9/2011 | Green et al. |
| 2011/0233152 A1 | 9/2011 | Wieczorek et al. |
| 2011/0259796 A1 | 10/2011 | Chen et al. |
| 2012/0031824 A1 | 2/2012 | Braunheim et al. |
| 2012/0234743 A1 | 9/2012 | Braunheim et al. |
| 2012/0234748 A1 | 9/2012 | Little et al. |
| 2012/0248034 A1 | 10/2012 | Segit et al. |
| 2013/0062270 A1 | 3/2013 | Braunheim |
| 2013/0092639 A1 | 4/2013 | Harp et al. |
| 2013/0146524 A1 | 6/2013 | Veit et al. |
| 2013/0248436 A1 | 9/2013 | Hacker et al. |
| 2013/0264275 A1 | 10/2013 | John |
| 2013/0327699 A1 | 12/2013 | Gaenswein et al. |
| 2014/0034580 A1 | 2/2014 | Ruijun |
| 2014/0109885 A1 | 4/2014 | Kalayci et al. |
| 2014/0284264 A1 | 9/2014 | Klein et al. |
| 2014/0311963 A1 | 10/2014 | Bortnik et al. |
| 2014/0331626 A1 | 11/2014 | Nagy et al. |
| 2015/0027942 A1 | 1/2015 | Chen et al. |
| 2015/0290561 A1 | 10/2015 | Barsness et al. |
| 2016/0038865 A1 | 2/2016 | Jones et al. |
| 2016/0074787 A1 | 3/2016 | Schmalz et al. |
| 2017/0144091 A1 | 5/2017 | Wolhowe |
| 2018/0185777 A1 | 7/2018 | Rahmathullah et al. |

FOREIGN PATENT DOCUMENTS

| | | |
|---|---|---|
| CN | 102753246 | 10/2012 |
| CN | 102858441 | 10/2012 |
| DE | 3631846 | 4/1987 |
| DE | 3921369 | 1/1990 |
| DE | 4409570 | 5/1995 |
| DE | 4417298 | 11/1995 |
| DE | 19826032 | 12/1999 |
| DE | 19850379 | 4/2000 |
| DE | 19951085 | 4/2001 |
| DE | 102004025274 A1 | 12/2004 |
| DE | 102005015194 | 10/2006 |
| DE | 19716085 | 2/2007 |
| DE | 202006001793 | 3/2007 |
| DE | 202006006084 | 9/2007 |
| DE | 102006060128 | 6/2008 |
| DE | 202006019301 | 6/2008 |
| DE | 102007009352 | 8/2008 |
| DE | 102012109761 | 5/2013 |
| EP | 260069 | 3/1988 |
| EP | 1233173 | 8/2002 |
| EP | 1256707 | 11/2003 |
| EP | 0754483 | 2/2004 |
| EP | 1695753 | 8/2006 |
| EP | 1932574 | 6/2008 |
| EP | 1974786 | 10/2008 |
| EP | 2535550 | 6/2014 |
| FR | 2601600 | 1/1988 |
| FR | 2864452 | 7/2005 |
| FR | 2879944 | 7/2007 |
| GB | 1088029 | 10/1967 |
| GB | 2241443 | 9/1991 |
| JP | 848-021553 | 6/1973 |
| JP | H05154304 A | 6/1993 |
| JP | 2001038129 | 2/2001 |
| JP | 2002-050985 | 2/2002 |
| JP | 2004-194418 | 7/2004 |
| JP | 2004-195418 | 7/2004 |

(56) References Cited

FOREIGN PATENT DOCUMENTS

| | | |
|---|---|---|
| JP | 2006-159156 | 6/2006 |
| JP | 2008-518770 A | 6/2008 |
| JP | 2009-106878 | 5/2009 |
| JP | 2010-529902 A | 9/2010 |
| JP | 2011-036731 A | 2/2011 |
| JP | 2013-094699 | 5/2013 |
| JP | 2013-519825 A | 5/2013 |
| JP | 2013521105 A | 6/2013 |
| JP | 2013521428 | 6/2013 |
| JP | 2015037783 A | 2/2015 |
| WO | 1999/019043 | 4/1999 |
| WO | 2002/053258 | 7/2002 |
| WO | 2004/082804 | 9/2004 |
| WO | 2005/021131 | 3/2005 |
| WO | 2007/006370 | 1/2007 |
| WO | 2007/010037 | 1/2007 |
| WO | 2008/023029 | 2/2008 |
| WO | 2008/057397 | 5/2008 |
| WO | 2010/012617 | 2/2010 |
| WO | 2010/020489 | 2/2010 |
| WO | 2010/020514 | 2/2010 |
| WO | 2010/132785 | 11/2010 |
| WO | 2011/052818 | 5/2011 |
| WO | 2011100712 A1 | 8/2011 |
| WO | 2011/106534 | 9/2011 |
| WO | 2011/113723 | 9/2011 |
| WO | 2011/127479 | 10/2011 |
| WO | 2011/146474 | 11/2011 |
| WO | 2012/059389 | 5/2012 |
| WO | 2012/076692 | 6/2012 |
| WO | 2011/100712 | 8/2012 |
| WO | 2013/000807 | 1/2013 |
| WO | 2015/157638 | 10/2015 |
| WO | 2016/004365 | 1/2016 |
| WO | 2016/210153 | 12/2016 |

OTHER PUBLICATIONS

"International Preliminary Report on Patentability," for PCT Application No. PCT/US2016/039049 mailed Jan. 4, 2018 (6 pages).

"International Preliminary Report on Patentability," from International Application No. PCT/US2011/031983, mailed Oct. 18, 2012 (9 pages).

"International Search Report & Written Opinion," for PCT/US2015/039077 mailed Oct. 12, 2015 (9 pages).

"International Search Report & Written Opinion," for PCT/US2016/039049 mailed Sep. 19, 2016 (8 pages).

"International Search Report & Written Opinion," from International Application No. PCT/US2011/031983, corresponding to U.S. Appl. No. 61/322,673, mailed Jun. 20, 2011 (12 pages).

Epps, et al., "Pore Size and Air Permeability of Four Nonwoven Fabrics", Jun. 1, 2000, International Nonwovens Journal, 9(2):18-22. Original Paper/Peer Reviewed copy submitted.

Extended European Search Report mailed Nov. 16, 2018, for EP Application No. 16815319.5, 5 pages.

File History for U.S. Appl. No. 13/639,955 downloaded Mar. 19, 2018 (432 pages).

Chinese Patent Application No. 201680035544.9, filed Jun. 23, 2016, Notification for Patent Reexamination issued Mar. 22, 2023, 15 pages. With English translation.

Xue, "Modern Disinfectionology", Jul. 2002, People's Military Medical Publisher, title page, publication information page, and p. 225. No translation provided, see Chinese Patent Application No. 201680035544.9, Notification for Patent Reexamination, for statement of relevance.

Xue; et al., "High Pressure Water Jet Technology and Application", Aug. 1998, Mechanical Industry Press, title page, publishing information page, and pp. 316-317. No translation provided, see Chinese Patent Application No. 201680035544.9, Notification for Patent Reexamination, for statement of relevance.

* cited by examiner

COMPOSITE MEDIA FOR FUEL STREAMS

This is a continuation application of U.S. patent application Ser. No. 15/739,841, filed Dec. 26, 2017, which is the § 371 U.S. National Stage of International Application No. PCT/US2016/039049, filed Jun. 23, 2016, which claims priority to U.S. Provisional Patent Application No. 62/185,505, filed on Jun. 26, 2015, the disclosures of which are herein incorporated by reference in their entireties.

FIELD OF THE TECHNOLOGY

The present technology is generally related to filter media and, more particularly, to coalescing and particulate filtration media for fuel streams.

BACKGROUND

Filtration of liquid fuels for use in internal combustion engines is often essential to proper engine performance. For example, various diesel engines currently use fuel filters to target water and particles that can be found in the diesel fuel. This water and particle removal is necessary to provide favorable engine performance as well as to protect the engine components from damage. Free water, which exists as a separate phase in the fuel, can be a serious concern as it causes various problems including damage to engine components through cavitation and corrosion, and promotion of microbiological growth. Free water is differentiated from dissolved water, which exists as a continuous phase and is of little concern to engine performance. Free water can be suspended as droplets of various sizes, which can be classified as coarse and/or emulsified water, where coarse water generally refers to water droplets greater than 60 microns in diameter and emulsified water generally refers to water droplets below 60 microns in diameter. While some existing fuel filtration technology attempts to coalesce the fuel-entrained free water into larger droplets—thereby making the water easier to separate from the fuel—some fuel additives that are commonly used can stabilize the water droplets, thereby making it difficult to coalesce the free water.

Particulate contaminants also can create significant problems in engine performance and can result in damage to the engine. Particulate contamination can include hard particle debris such as dust and dirt, as well as fuel contamination products (FCPs) including fuel degradation products (FDPs), and contaminants such as waxes, asphaltenes, sterol glucosides, steryl glucosides, and sterol glycosides. Further complicating matters, particulate contamination interferes with the ability of a coalescing media to effectively coalesce free water. While some technologies attempt to resolve this issue by using a media having an upstream particle filtration layer followed by a coalescing media layer, the effectiveness of the coalescing layer is generally limited to the lifecycle of the particle filtration layer. As such, improved filter media are desirable to filter particulates and coalesce entrained water from fuel stream throughout the service life of the media.

SUMMARY

The technology disclosed herein generally relates to a filter material for use in fuel-water separation has a particle filtration layer and a coalescing layer downstream of, and coupled to, the particle filtration layer. The particle filtration layer is substantially constructed of binder fibers and media fibers. The coalescing layer has at least 70% glass fibers by weight. In some example embodiments, a filter material for liquid fuels has a particle filtration layer and a coalescing layer downstream of the particle filtration layer. The particle filtration layer has binder fibers and media fibers and is substantially free of meltblown materials. The ratio of air permeability of the particle filtration layer to air permeability of the coalescing layer ranges from about 3:1 to about 15:1.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense.

BRIEF DESCRIPTION OF THE DRAWINGS

Examples may be more completely understood in connection with the following drawings.

While embodiments herein are susceptible to various modifications and alternative forms, specifics thereof have been shown by way of example and drawings, and will be described in detail. It should be understood, however, that the scope herein is not limited to the particular examples described. On the contrary, the intention is to cover modifications, equivalents, and alternatives falling within the spirit and scope herein.

DETAILED DESCRIPTION

Figure 1:
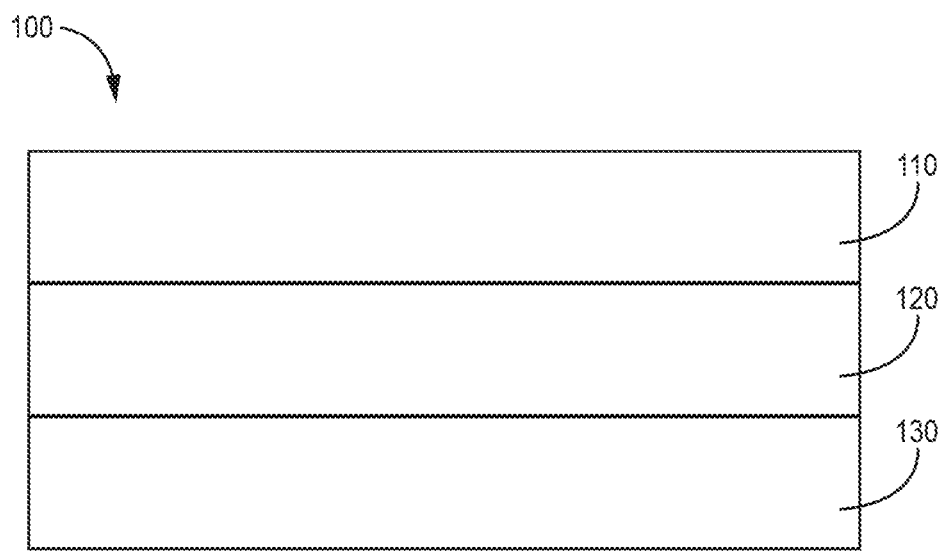
FIG. 1 is a cross sectional schematic view of a media construction consistent with some embodiments of the currently-described technology.

FIG. 1 depicts an example filter material 100 consistent with the technology disclosed herein. The filter material 100 is generally configured for use for fuel-water separation. The filter material 100 is also configured for use to filter particles from fuel, in a variety of embodiments. The filter material 100 is generally configured to filter out particulates and coalesce free water in a fuel stream. The filter material 100 generally has a particle filtration layer 110, a coalescing layer 120 downstream of the particle filtration layer 110, and a support layer 130 downstream of the coalescing layer 120.

The particle filtration layer 110 is substantially constructed of binder fibers and media fibers in a variety of embodiments. The term "substantially constructed of" or "substantially comprising" is used herein to mean that the material at-issue is at least 95% by weight of the specified components. In a variety of embodiments the particle filtration layer 110 is substantially free of meltblown material. The particle filtration layer can be constructed as disclosed, for example, U.S. Pub. No. 2012/0234748, filed on Mar. 16, 2012 or, in another example, U.S. Pat. No. 7,314,497, issued on Jan. 1, 2008, or, in another example, U.S. Pat. No. 9,056,268, issued on Jun. 16, 2015, each of which are incorporated by reference herein.

Media Fiber

Media fiber is that fiber that provides primary filtration properties to the media, such as controllable pore size, permeability and efficiency. The media fiber may be, for example, glass fiber, carbon fiber, ceramic fibers, polyester or cellulose. A substantial proportion of glass fiber can be used in some example implementations of the particle filtration layer. The glass fiber provides pore size control and cooperates with the other fibers in the media to obtain a media of substantial flow rate, high capacity, substantial efficiency and high wet strength.

The term glass fiber "source" means a glass fiber composition characterized by an average diameter and aspect ratio that is made available as a distinct raw material. Suitable media can be glass types known by the designations: A, C, D, E, Zero Boron E, ECR, AR, R, S, S–2, N, and the like, and generally, any glass that can be made into fibers either by drawing processes used for making reinforcement fibers or spinning processes used for making thermal insulation fibers. Such fiber is typically used as a diameter about 0.1 to 10 micrometers and an aspect ratio (length divided by diameter) of about 10 to 10,000. These commercially available fibers are characteristically sized with a sizing coating. Generally suitable glass fibers should have an average diameter of less than 15 microns, more desirably less than 10 microns, and preferably less than 5 microns. Commercial sources for suitable glass materials include the following: Lauscha International, Evanite, Johns Manville, Owen Corning, and others.

In addition to glass fibers, an alternative fibers suitable in some implementations for the media fiber comprises carbon fibers, cellulose fibers, and/or polyester fibers. In some embodiments the media fibers are staple fibers. Generally suitable carbon fibers should have an average diameter of less than 25 microns, more desirably less than 15 microns, and preferably less than 10 microns. Commercial sources for suitable carbon materials include the following: Unitika, Kynol, and others.

In embodiments, the particle filtration layer contains glass fibers in an amount corresponding to about 10% to 90% by weight of the total solids in the particle filtration layer, or about 20 to 80% by weight of the total solids in the particle filtration layer, or about 25% to 75% by weight of the total solids in the particle filtration layer, or about 50% by weight of the total solids in the particle filtration layer. In some embodiments, a blend of more than one source of glass fiber is employed, wherein the blend of more than one source of glass fiber is employed to form the total weight percent of glass fiber in the particle filtration layer. In some such embodiments, the blend of glass fiber sources is selected to control the permeability of the particle filtration layer. For example, in some embodiments, combining glass fibers from more than one source of glass fiber having an average fiber diameter of about 0.3 to 0.5 micrometer, glass fiber having an average fiber diameter of about 1 to 2 micrometers, glass fiber having an average fiber diameter about 3 to 6 micrometers, glass fiber with a fiber diameter of about 6 to 10 micrometers, and glass fiber with fiber diameter of about 10 to 100 micrometers in varying proportions, including blends of two or more thereof, increases the permeability of the particle filtration layer. In some such embodiments, the glass fiber blends are selected to impart a controlled pore size, resulting in a defined permeability, to a particle filtration layer.

Binder Fiber

The binder fiber is generally configured to provide support for the media fiber, and also can add improved handling, strength, and resistance to compression to the media fiber. In certain implementations the binder fiber also provides improved processability during furnish formulation, sheet or layer formation and downstream processing (including thickness adjustment, drying, cutting and filter element formation).

The binder fiber may be, for example, a bicomponent fiber. As used herein, "bicomponent fiber" means a fiber formed from a thermoplastic material having at least one fiber portion with a melting point and a second thermoplastic portion with a lower melting point. The physical configuration of these fiber portions is typically in a side-by-side or sheath-core structure. In side-by-side structure, the two resins are typically extruded in a connected form in a side-by-side structure. Other useful morphologies include lobed bicomponent fibers, wherein the tips of the fibers have lobes that are formed from a lower melting point polymer than the rest of the fiber.

The use of the bicomponent fiber enables the formation of a particle filtration layer with no separate resin binder or with minimal amounts of a resin binder that substantially reduces or prevents film formation from the binder resin and also prevents lack of uniformity in the media or element due to migration of the resin to a particular location of the media layer. The use of the bicomponent fiber can permit reduced compression, improved solidity, and increased tensile strength in the filter media and improves utilization of media fiber such as glass fiber and other sub-micron fiber materials that are added to the media layer or filter element.

The media fibers and binder fibers combine in various proportions to form a relatively high strength material having substantial filtration capacity, permeability and filtration lifetime. Such a media can be made with optional secondary fibers and other additive materials. These components combine to form a high strength material having substantial flow capacity, permeability and high strength.

Various combinations of polymers for the bicomponent fiber may be used, but generally the first polymer component melt at a temperature lower than the melting temperature of the second polymer component and typically below 205° C. Further, the bicomponent fibers are typically integrally mixed and evenly dispersed with the media fibers, such as glass fibers. Melting of the first polymer component of the bicomponent fiber is necessary to allow the bicomponent fibers to form a tacky skeletal structure, which upon cooling, captures and binds many of the media fibers, as well as binds to other bicomponent fibers. In the sheath-core structure, the low melting point (e.g., about 80 to 205° C.) thermoplastic is typically extruded around a fiber of the higher melting (e.g., about 120 to 260° C.) point material.

In use, the bicomponent fibers typically have a fiber diameter of about 5 to 50 micrometers, often about 10 to 20 micrometers, and typically in a fiber form generally have a length of 0.1 to 20 millimeters or often have a length of about 0.2 to about 15 millimeters. Such fibers can be made from a variety of thermoplastic materials including polyolefins (such as polyethylenes, polypropylenes), polyesters (such as polyethylene terephthalate, polybutylene terephthalate, polycyclohexylenedimethylene terephthalate), nylons including nylon 6, nylon 6,6, nylon 6,12, etc.

Bicomponent fibers are useful in forming mechanically stable, but strong, permeable filtration media that can withstand the mechanical stress of the passage of debris laden air at high velocity and can maintain the loading of debris during use, as well as withstand repeated washing and drying cycles between loadings. The bicomponent fibers useful in the current technology are of a core/shell (or sheathed) morphology, side-by-side morphology, islands-in-the-sea morphology, or lobed morphology. The bicomponent fibers are made up of at least two thermoplastic materials having different melting points. In some embodiments, thermoplastic polymers useful in forming either the core or the sheath of the bicomponent fibers useful in the particle filtration layer include polyolefins such as polyethylene, polypropylene, polybutylene, poly-α-octene, and copolymers thereof including linear low density, low density, high density, ultra-high density, and other morphological and compositional designations; polytetrahaloethylenes such as polytetrafluoroethylene and polychlorotrifluoroethylene; polyesters such as polyethylene terephthalate, polybutylene terephthalate, or polyethylene naphthalate; polyvinyl acetate, polyvinyl alcohol, and copolymers thereof; polyvinyl halides such as polyvinyl chloride, polyvinylidene halides such as polyvinylidene chloride, polyvinylidene fluoride, and the like and copolymers thereof; polyacetals such as polyvinyl butyral, acrylic resins (polyacrylates) such as polymethylacrylate esters and polymethylmethacrylate esters and copolymers thereof including copolymers of acrylic acid and salts thereof; polyamides such as nylon 6, nylon 66, nylon 6,10, nylon 46, and the like and copolymers thereof; polystyrene and copolymers thereof; polyurethanes; polyureas; cellulosic resins, namely cellulose nitrate, cellulose acetate, cellulose acetate butyrate, ethyl cellulose, and the like; copolymers of any of the above materials, such as ethylene-vinyl acetate copolymers, ethylene-acrylic acid copolymers, styrene-butadiene block copolymers, KRATON® rubbers, and the like.

In embodiments, a polyolefin/polyester sheath/core bicomponent fiber is employed whereby the polyolefin sheath melts at a lower temperature than the polyester core. In other embodiments, two polyolefins, or two polyesters, two polyvinyl halide, two polyvinylidene halide, two polyamide polymers, or any other two polymers that are similar or identical chemically are employed as core and sheath, wherein compositional (e.g. the particular monomer composition mix used to synthesize the polymer, or the blockiness of the monomer concentration in a copolymer), molecular weight, or morphological differences such as degree of branching or degree of side chain crystallization and the like provide lower and higher melting or softening polymer materials.

In some embodiments, the lower melting point component of the bicomponent fibers is employed as the sheath in a core/sheath morphology (or shell in a core/shell morphology), as the lobes in a lobed morphology, as the "islands" in an islands-in-the-sea morphology, or as one side of a side-by-side morphology. The lower melting component provides a melt fusing capability to the formed filter media pack, wherein the nonwoven wet laid or air laid webs are heated to a temperature above the melting point or glass transition temperature of the lower melting component and below the melting point or glass transition temperature of the higher melting component. In embodiments, melt fusing is accomplished when the molten or softened fiber components contact other bicomponent fibers, as well as any other fibers and additives within the formed wet laid or air laid particle filtration layer.

In such embodiments, when the temperature is subsequently reduced to at or below the intended end use temperature, the bicomponent fibers have become at least partially melt fused by virtue of the sheath (or lobe or side), while substantially retaining the nonwoven characteristics of loft, permeability, porosity, basis weight, thickness, and the like imparted by the air laid or wet laid process employed to form the particle filtration layer. These nonwoven characteristics are retained by virtue of the higher melting core or side of the bicomponent fiber that retains its fibrous morphology during melt fusing. Further, the melt fused bicomponent fiber imparts desirable properties, including reduced compression and increased tensile strength; the melt fused bicomponent fiber further improves utilization and retention of glass fiber and other secondary fibers and/or additive materials in the particle filtration layer.

In some embodiments, core/sheath bicomponent fibers known as Advansa 271P available from E. I. Dupont Nemours, Wilmington DE is useful in forming both the high loft and low loft filter media useful in the particle filtration layer. Other useful bicomponent fibers include the T-200 series of concentric core/sheath fibers available from Fiber Innovation Technology, Inc. of Johnson City, TN; Kuraray N720, available from Engineered Fibers Technology, LLC of Shelton, CT; Nichimen 4080, available from Nichimen America Inc. of New York, NY; and similar materials. All of these fibers demonstrate the characteristics of melt fusing as described above.

In some embodiments, a particle filtration layer has about 50% by weight of Advansa 271P bicomponent fiber (available from E. I. Dupont Nemours, Wilmington DE) and about 50% by weight of Lauscha B50 glass microfiber (available from Lauscha Fiber Intl. of Summerville, SC). The particle filtration layer is formed by a wet laid or papermaking type process to result in a media having a basis weight of about 60 g/m² to 70 g/m², layer thickness of 0.5 mm to 0.65 mm at 0.125 psi, compressibility of 15% to 20% between 0.125 psi and 1.5 psi, and solidity of 6-7% at 0.125 psi.

Particle Filtration Layer Properties

The performance properties of the particle filtration layer are impacted by controlling attributes relating to the fiber size, pore structure, solidity, and compressibility of the particle filtration layer. Generally, the use of a media that has relatively low solidity and low compressibility, while also having a relatively small mean flow pore size but a relatively large maximum flow pore size, results in an example media construction that can remove particulates without premature plugging. In some embodiments the particle filtration layer is hydrophilic in air, meaning that a water droplet, in air, has a contact angle with the surface of the filtration layer of less than 90 degrees, when measured using a standard contact angle measurement device such as the First Ten Angstroms contact angle instrument. The hydrophilicity of the particle filtration layer 110 can distinguish from traditional melt-blown materials that can be used for particle filtration in fuels, which tend to be hydrophobic in air. "Hydrophobic in air" generally means that a water droplet, in air, has a contact angle with the surface of a media that is greater than 90 degrees.

In general the media fiber has a smaller diameter than the binder fiber. In example embodiments, the media fiber has an average diameter of less than 5 microns, while the binder fiber has an average diameter of greater than 5 microns. More typically, the media fiber will have an average diameter from 0.1 to 20 microns, and optionally from 0.1 to 15 microns. In some implementations the media fiber will have an average diameter from 0.4 to 12 microns, and in some implementations from 0.4 to 6.5 microns. Media fibers with an average diameter of less than 10 microns, less than 7.5 microns, less than 6.5 microns, and less than 5 microns are often desirable. The binder fiber will typically have a diameter from 5 to 40 microns, more typically from 7 to 20 microns, and often from 10 to 14 microns. Note that the diameter of both the media fibers and the binder fibers can be variable. In some cases the fiber diameters will vary along their lengths, while more commonly fibers of different diameters will be incorporated. It will be understand that, as used herein, fiber diameters are based upon average fiber diameters for the fibers present in the media.

A further characteristic of the particle filtration layer is that it typically has a relatively low solidity level. As used herein, solidity is the solid fiber volume divided by the total volume of the filter medium at issue, usually expressed as a percentage. In a typical implementation, solidity of the particle filter layer is less than 15 percent, more typically less than 12 percent, and more frequently less than 10 percent. In certain embodiments the solidity is less than 9 percent, less than 8 percent, or less than 7 percent. The particle filtration layer generally has an air permeability ranging from about 45 cfm/ft$^2$ to about 200 cfm/ft$^2$, where the air permeability is the Frazier permeability. Air permeability relates to the quantity of air (ft$^3$-min$^{-1}$-ft$^{-2}$ or ft-min$^{-1}$) that will flow through a filter medium at a pressure drop of 0.5 inches of water. In general, permeability, as the term is used is assessed by the Frazier Permeability Test according to ASTM D737 using a Frazier Permeability Tester available from Frazier Precision Instrument Co. Inc., Gaithersburg, Maryland or a TexTest 3300 or TexTest 3310 available from Advanced Testing Instruments Corp (ATI), Spartanburg, So. Carolina 29301.

An additional characteristic of the particle filtration layer is that it is relatively incompressible, especially relative to the solidity of the media. Compressibility is the resistance (i.e.) to compression or deformation in the direction of fluid flow through the media. A suitable test for media compression is a compression force vs. distance test, wherein a stack of media is compressed under a load to determine compression percent. An example of such a test is as follows: A 2.54 centimeter diameter probe and a 5 kg load cell are used to compress a stack of media having a total thickness of 25 mm. The test is performed at a speed of 1 mm/sec, with a 30 mm start distance from the bottom, and a data trigger of 0.5 g. The end force target is 4,800 g. The media sample size can be 2.22 centimeter diameter circle, oriented with media samples to form a stack directly underneath the test probe. The pressure on the media in such implementations is approximately 1.24 kg/cm'. The number of stacked samples used should be sufficient to have a total thickness of 25 mm, thus the total number of samples will vary depending upon individual thickness of the tested media material. The data is analyzed in terms of the following equation:

compression percent=$x/t_1$ wherein $t_1$=thickness from the bottom of stacked samples when force=0.5 grams, and $t_2$=thickness from bottom of stacked samples when force=4,800 grams, with x equal to the distance the probe travelled during the test, which is the distance $t_1$-$t_2$. Suitable instruments for performing this test include, for example, a TA.XT2i Texture Analyzer from Stable Micro Systems utilizing Texture Expert Exceed software version 2.64.

The compressive strength of the particle filtration layer must be sufficient to maintain a material's thickness and thereby maintain its pore structure and filtration flow and particulate removal performance. In some embodiments, the particle filtration layer has a compressibility of less than 40 percent at a pressure of 1.24 kg/cm$^2$. In other implementations the particle filtration layer has a compressibility of less than 30 percent at a pressure of 1.24 kg/cm$^2$, less than 20 percent at a pressure of 1.24 kg/cm$^2$, and less than 10 percent at a pressure of 1.24 kg/cm$^2$. In addition, the compressibility of the particle filtration layer divided by the solidity is often less than 4, frequently less than 3, can be less than 2, and in some implementations is less than 1. For example, in an implementation where compressibility is 20 percent, and solidity is 10 percent, this number is 2.0.

Additional Resins and Fibers in the Particle Filtration Layer

Non-fiber binder resins can be used to help bond the media fiber, and optionally the binder fiber, into a mechanically stable particle filtration layer. Such thermoplastic binder resin materials can be used as a dry powder or solvent system, but are typically aqueous dispersions of vinyl thermoplastic resins. A non-fiber resinous binder component is not necessary to obtain adequate strength for the particle filtration layer, but can be used.

Non-fiber binder resins include vinyl acetate materials, vinyl chloride resins, polyvinyl alcohol resins, polyvinyl acetate resins, polyvinyl acetyl resins, acrylic resins, methacrylic resins, polyamide resins, polyethylene vinyl acetate copolymer resins, thermosetting resins such as urea phenol, urea formaldehyde, melamine, epoxy, polyurethane, curable unsaturated polyester resins, polyaromatic resins, resorcinol resins and similar elastomer resins.

Suitable materials for the water soluble or dispersible binder polymer are water soluble or water dispersible thermosetting resins such as acrylic resins. methacrylic resins, polyamide resins, epoxy resins, phenolic resins, polyureas, polyurethanes, melamine formaldehyde resins, polyesters and alkyd resins, generally, and specifically, water soluble acrylic resins, methacrylic resins, and polyamide resins. Such liquid binders are typically dispersions of platelets which coat the fiber and promote adhesion of fiber to fiber in the final non-woven matrix. Sufficient resin is added to the furnish to fully coat the fiber without causing film over of the pores formed in the sheet, media, or filter material. The resin can be added to the furnish or can be applied to the media after formation.

A latex binder used to bind together the three-dimensional non-woven fiber web in each non-woven layer, or used as the additional adhesive, can be selected from various latex adhesives known in the art. The skilled artisan can select the particular latex adhesive depending upon the type of cellulosic fibers that are to be bound. The latex adhesive may be applied by known techniques such as spraying or foaming. Generally, latex adhesives having from 15 to 25% solids are used. The dispersion can be made by dispersing the fibers and then adding the binder material or dispersing the binder material and then adding the fibers. The dispersion can, also, be made by combining a dispersion of fibers with a dispersion of the binder material. The concentration of total fibers in the dispersion can range from 0.01 to 5 or 0.005 to 2 weight percent based on the total weight of the dispersion. The concentration of binder material in the dispersion can range from 10 to 50 weight percent based on the total weight of the fibers.

The particle filtration layer can also contain secondary fibers made from a number of both hydrophilic, hydrophobic, oleophilic, and oleophobic fibers. These fibers cooperate with the glass (or other media) fiber and the bicomponent fiber to form a mechanically stable, but strong, permeable filtration media that can withstand the mechanical stress of the passage of fluid materials and can maintain the loading of particulate during use. Secondary fibers are typically monocomponent fibers with a diameter that can range from about 0.1 to about 50 micrometers and can be made from a variety of materials. One type of secondary fiber is a binder fiber that cooperates with other components to bind the materials into a sheet. Another type of secondary fiber is a structural fiber that cooperates with other components to increase the tensile and burst strength of the materials in dry and wet conditions. Additionally, the binder fiber can include fibers made from such polymers as polyvinyl chloride and polyvinyl alcohol. Secondary fibers can also include inorganic fibers such as carbon/graphite fiber, metal fiber, ceramic fiber and combinations thereof.

Secondary thermoplastic fibers can be, but are not limited to, polyester fibers, polyamide fibers, polypropylene fibers, copolyetherester fibers, polyethylene terephthalate fibers, polybutylene terephthalate fibers, polyetherketoneketone (PEKK) fibers, polyetheretherketone (PEEK) fibers, liquid crystalline polymer (LCP) fibers, and mixtures thereof. Polyamide fibers include, but are not limited to, nylon 6, 66, 11, 12, 612, and high temperature "nylons" (such as nylon 46) including cellulosic fibers, polyvinyl acetate, polyvinyl alcohol fibers (including various hydrolysis of polyvinyl alcohol such as 88% hydrolyzed, 95% hydrolyzed, 98% hydrolyzed and 99.5% hydrolyzed polymers), cotton, viscose rayon, thermoplastic such as polyester, polypropylene, polyethylene, etc., polyvinyl acetate, polylactic acid, and other common fiber types. The thermoplastic fibers are generally fine (about 0.5-20 denier diameter), short (about 0.1-5 cm long), staple fibers, possibly containing precompounded conventional additives, such as antioxidant, stabilizers, lubricants, tougheners, etc. In addition, the thermoplastic fibers may be surface treated with a dispersing aid. The preferred thermoplastic fibers are polyamide and polyethylene terephthalate fibers, with the most preferred being polyethylene terephthalate fibers.

Production of the Particle Filtration Layer

In making the particle filtration layer, in certain embodiments a fiber mat is formed using either wet or dry processing. The mat is heated to melt thermoplastic materials to form the media by internally adhering the fibers. The bicomponent fiber permits the fibers to fuse into a mechanically stable media. The bicomponent fiber having a thermally bonding exterior sheath causes the bicomponent fiber to bind with other fibers in the media layer.

The particle filtration layer is typically made using papermaking processes. However, the media can be made by air laid processes that use similar components adapted for air laid processing. The machines used in wet laid sheet making include hand laid sheet equipment, Fourdrinier papermaking machines, cylindrical papermaking machines, inclined papermaking machines, combination papermaking machines and other machines that can take a properly mixed paper, form a layer or layers of the furnish components, and remove the fluid aqueous components to form a wet sheet.

In example wet laid processing, the media is made from an aqueous furnish comprising a dispersion of fibrous material in an aqueous medium. The aqueous liquid of the dispersion is generally water, but may include various other materials such as pH adjusting materials, surfactants, defoamers, flame retardants, viscosity modifiers, media treatments, colorants and the like. The aqueous liquid is usually drained from the dispersion by conducting the dispersion onto a screen or other perforated support retaining the dispersed solids and passing the liquid to yield a wet paper composition. The wet composition, once formed on the support, is usually further dewatered by vacuum or other pressure forces and further dried by evaporating the remaining liquid. After liquid is removed, thermal bonding takes place typically by melting some portion of the thermoplastic fiber, resin or other portion of the formed material. The melt material binds the component into a layer.

A fiber slurry containing the materials is typically mixed to form a relatively uniform fiber slurry. The fiber slurry is then subjected to a wet laid papermaking process. Once the slurry is formed into a wet laid sheet, the wet laid sheet can then be dried, cured or otherwise processed to form a dry permeable, but real sheet, media, or filter. Once sufficiently dried and processed to filtration media, the sheets are typically about 0.25 to 1.9 millimeter in thickness, having a basis weight of about 20 to 200 or 30 to 150 g-m$^2$. For a commercial scale process, the bicomponent mats are generally processed through the use of papermaking-type machines such as commercially available Fourdrinier, wire cylinder, Stevens Former, Roto Former, Inver Former, Venti Former, and inclined Delta Former machines.

In some implementations an inclined Delta Former machine is utilized. A bicomponent mat can be prepared by forming pulp and glass fiber slurries and combining the slurries in mixing tanks, for example. The amount of water used in the process may vary depending upon the size of the equipment used. The furnish may be passed into a conventional head box where it is dewatered and deposited onto a moving wire screen where it is dewatered by suction or vacuum to form a non-woven bicomponent web. The web can then be coated with a binder by conventional means, e.g., by a flood and extract method and passed through a drying section which dries the mat and cures the binder, and thermally bonds the sheet, media, or filter. The resulting mat may be collected in a large roll for future processing, for laminating to a second media material (such as a layer of cellulose media), or for forming into filter elements.

Figure 2:
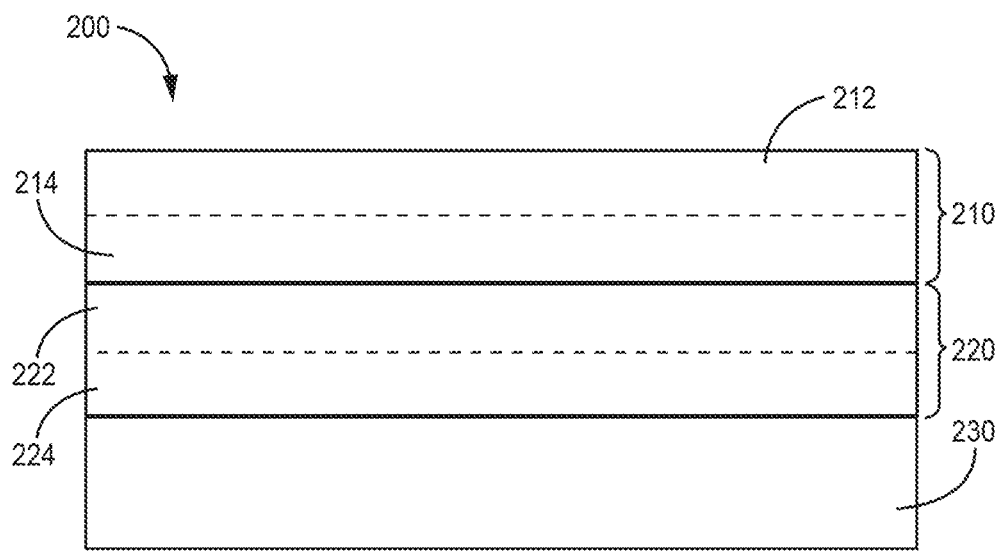
FIG. 2 is a cross-sectional schematic view of another media construction consistent with some embodiments of the currently-described technology.

The particle filtration layer 110 can be constructed of multiple layers of media, in a variety of embodiments. Generally, each media layer in the particle filtration layer 110 will be constructed as described herein. Such an embodiment is depicted in FIG. 2, which is described in more detail, below.

Coalescing Layer

Returning to FIG. 1, the coalescing layer 120 is positioned downstream of the particle filtration layer 110 and is coupled to the particle filtration layer 110. The coalescing layer 120 is generally configured to coalesce free water in a fuel stream passing there-through. The particle filtration layer 110 is generally configured to capture particulate contamination from the fuel stream, which prevents the captured particulates from interfering with the coalescing function of the coalescing layer 120. In some embodiments, the coalescing layer can also be configured to filter particulates in a fuel stream, however. The coalescing layer 120 can have a variety of configurations.

The coalescing layer 120 can have an average fiber diameter ranging from about 0.3 μm to about 10 μm, or from about 0.69 μm to about 7.5 μm. The coalescing layer 120 generally can have a thickness ranging from about 0.3 mm to about 1.0 mm, when measured at 8 psi. In some embodiments the coalescing layer 120 can have a thickness ranging from about 0.4 mm to about 0.7 mm when measured at 8 psi. The coalescing layer 120 is generally constructed to have a basis weight ranging from about 50 g/m$^2$ to about 150 g/m$^2$, or from about 80 g/m$^2$ to about 115 g/m$^2$. The coalescing layer 120 can have a basis weight that is higher than the basis weight of the particle filtration layer 110. The coalescing layer 120 generally has an air permeability that is less than the air permeability of the particle filtration layer 110. In some embodiments, the coalescing layer 120 has an air permeability that ranges from about 3 cfm/ft$^2$ to about 70 cfm/ft$^2$. In some particular embodiments, the coalescing layer 120 has an air permeability range of 10 to 40 cfm/ft$^2$. In some embodiments, the coalescing layer 120 can be multiple layers of adjacent coalescing material, such as in the embodiments described with reference to FIG. 2, below.

In a variety of embodiments, the coalescing layer 120 is a wet-laid media. The coalescing layer 120 can be substantially constructed of fibers, a surface treatment, and a binder material, meaning that the coalescing layer 120 is at least 95% by weight fibers, the surface treatment, and the binder material. In some embodiments the coalescing layer 120 is a nonwoven fibrous mat coated with a surface treatment, where the fibers are bonded with a binder material. The surface treatment is generally configured to modify the surface energy of the fibers therein, and the binder material is generally configured to bond the fibers of the coalescing layer 120.

The fibers of the coalescing layer 120 can be a variety of types of fibers and combinations of fibers, and are generally non-woven. The fibers of the coalescing layer 120 can be glass fibers, natural fibers, synthetic fibers, polymeric fibers, ceramic fibers, metallic fibers, carbon fibers, and combinations thereof. Other types of fibers are certainly contemplated. In some embodiments the coalescing layer 120 has glass fibers and polyester fibers. The fibers can be from 50% to 95% by weight of the coalescing layer 120. In some embodiments, the coalescing layer 120 is at least 70% by weight glass fibers. In some embodiments the coalescing layer 120 is at least 85% by weight glass fibers.

The surface treatment is generally configured to change the surface properties of the fibers within the coalescing layer 120. The surface treatment can have a variety of configurations and compositions, and in some embodiments the surfaces treatment is a compound that contains fluorine. One example surface treatment that can be used on the fibers of the coalescing layer is a polytetrafluoroethylene dispersion. Some other example surface treatments are fluoroalkyl acrylate polymers, perfluoroalkyl methylacrylate copolymers, fluorinated hydrocarbons, fluoroacrylate polymers, fluoroalkyl methacrylate polymers, perfluoroalkoxy polymer (PFA), fluorinated ethylene-propylene (FEP). The surface treatment can range from 0.01% to 25% of the coalescing layer 120 by weight. In some embodiments the surface treatment is from 5%-20% or 10%-15% of the coalescing layer 120 by weight.

The binder material is generally configured to bind the fibers in the coalescing layer 120. The binder material can be an acrylic resin or an epoxy, as examples. In some particular examples the binder material is an acrylic latex binder. In some examples the binder material is a styrene/acrylonitrile copolymer resin. The binder material can be an emulsion polymer, resins, epoxies, solution polymers, styrene-acrylates, styrene-butadiene, acrylics, vinyl acetates, acrylonitriles, urethanes, urea formaldehyde, melamine formaldehyde, acidified acrylates, polyvinyl alcohol, and combinations thereof. In an embodiment, the binder material can have a polymer that has been modified to comprise one or more functional groups. For example, the polymer may be functionalized to contain additional carboxylates. The coalescing layer 120 can be 3% to about 40% binder material by weight, alternatively from about 5% to about 25% binder material by weight, or from about 10% to about 20% binder material by weight.

Some embodiments of the technology disclosed herein, including those depicted in FIGS. 1 and 2, have a support layer 130 that is positioned downstream of the coalescing layer 120 and is coupled to the coalescing layer 120. The support layer 130 can be constructed of a variety of materials and combinations of materials, but is generally configured to provide structural support to the particle filtration layer 110 and the coalescing layer 120. In various embodiments the support layer 130 is at least configured to allow water droplets to exit the filter material 100 relatively intact and prevent emulsification of the coalesced water from the coalescing layer 120.

In some embodiments, the support layer is bicomponent fibers. In some such embodiments the bicomponent fibers are substantially continuous polyester fibers having a nylon sheath, such as Colback® supplied by Bonar Inc., based in Asheville, North Carolina. In some other embodiments, the support layer 130 is a cellulosic material. In some embodiments the support layer 130 is a scrim, such as a non-woven polyester scrim. In some embodiments the polyester scrim is Reemay supplied by Polymer Group, Inc. based in Charlotte, North Carolina. The support layer 130 can be a combination of materials such as cellulose and polyester. In some embodiments the support layer 130 is a wire mesh. Other materials are certainly contemplated for the support layer 130.

The support layer 130 can also have one or more binding materials. For example, in some embodiments the support layer is saturated with a phenolic resin, or any other type of binder. The support layer 130 can also be treated with one or more compositions to adjust properties of the support layer 130. In some embodiments the support layer 130 has a basis weight ranging from about 17 $g/m^2$ to about 200 $g/m^2$. The support layer 130 generally has an air permeability ranging from 10 $cfm/ft^2$ to about 1000 $cfm/ft^2$. In some embodiments, the support layer 130 has an air permeability above 30 $cfm/ft^2$.

It will be appreciated that the support layer 130 can contain fiber having an average diameter or cross-section greater than the average diameter of the media fiber in the particle filtration layer 110.

The coalescing layer 120 is coupled to the particle filtration layer 110. The support layer 130 is coupled to the coalescing layer 120. The phrase "coupled to" is intended to mean that the respective layers are fixed relative to each other. In some embodiments the layers are fixed relative to each other via being adhered to a filter element and are otherwise unbonded. In some embodiments, the respective layers are laminated together. For example, in some embodiments a low temperature crystalline polymer powder is used to laminate the layers together so as to make the composite media easily manufacturable into a number of different filter element configurations. Other methods of laminating the media layers together such as adhesive lamination or thermal bonding means are possible as well, such as through the use of web adhesives, hot melts, and so on. In some embodiments the layers are unbonded.

Filter material 100 consistent with the technology disclosed herein can have a variety of different configurations. In at least one embodiment, the filter material 100 lacks meltblown material. The filter material 100 can have a basis weight from 100 $g/m^2$ to 500 $g/m^2$, 200 $g/m^2$ to 400 $g/m^2$ or 250 $g/m^2$ to 350 $g/m^2$. The filter material 100 has a thickness ranging from 0.5 mm to 4 mm or 1 mm to 2 mm, where the thickness was measured at 1.5 psi. Generally, the air permeability of the coalescing layer 120 will be less than the air permeability of the particle filtration layer 110.

The air permeability of the particle filtration layer 110 and the coalescing layer 120 are generally related. The ratio of air permeability of the particle filtration layer 110 to the air permeability of the coalescing layer 120 will generally be between about 3:1 and about 15:1. In some instances, where the ratio of the air permeability of the particle filtration layer 110 to the air permeability of the coalescing layer 120 is too large, the coalescing layer 120 loads particulate matter relatively quickly, causing the coalescing layer 120 to foul prematurely, which prevents adequate coalescence. On the other hand, if the ratio of the air permeability of the particle filtration layer 110 to the air permeability of the coalescing layer 120 is too small, this could result in inadequate life for particulate filtration.

The air permeability of the resulting filter material 100 and the air permeability of each of the component layers can correspond to the size of the free water droplets to be coalesced from the fuel stream. Where the free water droplets to-be coalesced are characterized as coarse, the air permeability of the filter material 100 can be relatively larger. Where the free water droplets to-be-coalesced are characterized as emulsified, the air permeability of the filter material 100 can be relatively smaller. In some embodiments, the filter material 100 has an air permeability ranging from 1 cfm/ft² to 50 cfm/ft². In some embodiments, the filter material 100 has an air permeability ranging from 3 cfm/ft² to 20 cfm/ft². In some embodiments, the filter material 100 has an air permeability ranging from 5 cfm/ft² to 10 cfm/ft².

FIG. 2 depicts another example filter material consistent with the technology disclosed herein. In the current embodiment, the filter material 200 has an upstream particle filtration layer 212, a coalescing layer 220 downstream of the particle filtration layer 210 and a support layer 230 downstream of the coalescing layer 220. The particle filtration layer 210 has an upstream media layer 212 and a downstream media layer 214. In some embodiments the upstream media layer 212 and downstream media layer 214 can have different properties from one another, such as different pore sizes and pore size distributions. Generally, the air permeability of the particle filtration layer 210 will be understood herein as referring to the total resulting air permeability of its component layers 212, 214.

In the currently-depicted embodiment, the coalescing layer has two layers of coalescing material 222, 224, and in some embodiments there can be additional layers of coalescing material.

Although FIG. 2 depicts an embodiment where there are multiple layers of the coalescing layer 220 and multiple layers of particle filtration layer 210, it should be understood that in some embodiments where the particle filtration layer has multiple layers there can be a coalescing layer that is a single layer. Similarly, in some embodiments where there is a single layer within the coalescing layer, there can be multiple layers within the particle filtration layers. It will be appreciated that multiple support layers can also be incorporated in technologies described herein.

Test Results

A flat sheet of filter media consistent with the technology disclosed herein was tested against a comparison filter media known in the art. In particular, the example filter media consistent with the technology disclosed herein had an upstream particle filtration layer of glass fibers and bicomponent polyester binder fibers. The particle filtration layer was constructed of two media layers, where the upstream media layer had a higher air permeability than the downstream media layer. The total air permeability of the particle filtration layer was about 120 cfm/ft². The comparative filter media had a particle filtration layer of a traditional meltblown polyester, which is widely considered to be optimized for particulate filtration in the fuel filtering context. The meltblown polyester had an air permeability of about 25 cfm/ft². Both the example filter media (Sample B) and the comparative filter media (Sample A) had identical coalescing and support layers. The coalescing layer was a microglass media bonded with an acrylic resin, which had an air permeability of about 10 cfm/ft². The support layer had substantially continuous polyester fibers with a nylon sheath. The layers of media were unbonded in both samples.

The coalescing ability of the comparative and example media was compared by challenging the media with a water-fuel emulsion (ultra-low sulfur diesel fuel), with an average water droplet size of 15 μm, and then measuring the size of the water droplets leaving the media. Coalescence that achieves relatively larger water droplets is generally preferable, as larger droplets settle out the fuel stream more readily than smaller droplets. Droplet size is measured and described in terms of the following particle size distribution values: $D_{3,10}$, $D_{3,50}$, and $D_{3,90}$. The $D_{3,10}$ value represents a diameter at which 10% of the total volume of water in the fuel is defined by water droplets having a smaller droplet size than the $D_{3,10}$ value. The $D_{3,50}$ value represents the mean droplet diameter, where about 50% of the volume of water is defined by water droplets having a smaller diameter than the $D_{3,50}$ value and about 50% of the volume of water is defined by water droplets having a larger diameter than the $D_{3,50}$ value. Similarly, the $D_{3,90}$ value represents the droplet diameter at which 90% of the total volume of water is defined by droplets having a smaller diameter than the $D_{3,90}$ value.

When clean, the comparative media (Sample A) and example media (Sample B) performed relatively similarly. However, when loaded with dust, the example filter media outperformed the comparative media both in pressure differential and coalescence of water from the fuel.

To load with dust, a known amount of ISO medium test dust was suspended in the ultra-low sulfur diesel fuel, which was passed through each sample of media. Each media was loaded with 100 mg of dust and the pressure differential across the media was measured. The differential pressure across the comparative filter media (Sample A') was double that of the example filter media (Sample B'). Furthermore, the $D_{3,10}$ water droplets leaving the example media (Sample B') were over three times the size of the comparative media (Sample A'). Lastly, the example filter media was loaded with more ISO medium test dust until its pressure differential was about equal to that of the comparative media, which required 230 mg of dust (Sample B''), over double that of the comparative media (Sample A'). The sizes of the water droplets leaving Sample B'' were measured, and the $D_{3,10}$ value was over double that of the comparative media (Sample A'). Table 1, below reflects the relevant data:

TABLE 1

Coalesced droplet sizing distribution data for clean and dust loaded media composites.

| Loaded Dust | Sample A<br>0 mg | Sample A'<br>100 mg | Sample B<br>0 mg | Sample B'<br>100 mg | Sample B''<br>230 mg |
|---|---|---|---|---|---|
| $D_{3,90}$ | 4.25 mm | 3.92 mm | 4.02 mm | 3.91 mm | 4.09 mm |
| $D_{3,50}$ | 3.76 mm | 2.90 mm | 3.81 mm | 3.25 mm | 3.04 mm |
| $D_{3,10}$ | 2.53 mm | 0.63 mm | 2.46 mm | 2.3 mm | 1.31 mm |

The $D_{3,10}$ value of the dust-loaded medias distinguishes the performance of the example filter media (Samples B' and B'') from the comparative media (Sample A'), as it demonstrates that less volume of water remains emulsified in the fuel as smaller droplets when using the example filter media. The test data also suggests that the rate of reduction in the $D_{3,10}$ droplet size of the example filter media is lower than the comparative filter media. The test data demonstrates that media consistent with the technology disclosed herein has a higher dust holding capacity and, therefore, will have a relatively longer filter life than the comparative media. Furthermore, and surprisingly, the test data also demonstrates that, when the currently-described media exhibits the same pressure drop as the comparative media (and therefore the media are "fouled" to the same extent), the coalescing performance of the example media remains notably better than the comparative media.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

All publications and patent applications in this specification are indicative of the level of ordinary skill in the art to which this technology pertains. All publications and patent applications are herein incorporated by reference to the same extent as if each individual publication or patent application was specifically and individually indicated by reference.

The technology has been described with reference to various specific and preferred embodiments and techniques. However, it should be understood that many variations and modifications may be made while remaining within the spirit and scope of the technology.

What is claimed is:

1. A filter material for use in fuel-water separation comprising:
   a particle filtration layer comprising binder fibers and glass fibers, wherein the binder fibers and glass fibers are at least 95% of the particle filtration layer by weight, wherein the particle filtration layer has an air permeability of at least 45 cfm/ft$^2$, and the particle filtration layer has a compressibility of less than 40% at a pressure of 1.24 kg/cm$^2$;
   a coalescing layer downstream of the particle filtration layer and coupled to the particle filtration layer, the coalescing layer comprising acrylic resin and at least 70% glass fibers by weight, the coalescing layer has an air permeability of at least 10 cfm/ft$^2$; and
   a support layer downstream of the coalescing layer and coupled to the coalescing layer, wherein the filter material is configured to filter out particulates and coalesce free water in a fuel stream.

2. The filter material of claim 1, wherein the coalescing layer has an average fiber diameter of 0.3 μm to 10 μm.

3. The filter material of claim 1, wherein the particle filtration layer has an air permeability from about 45 cfm to about 200 cfm/ft$^2$ and the coalescing layer has an air permeability from 10 to about 70 cfm/ft$^2$.

4. The filter material of claim 1, wherein a ratio of the air permeability of the particle filtration layer to the coalescing layer ranges from about 3:1 to about 15:1.

5. The filter material of claim 1, wherein the coalescing layer has a basis weight from about 50 g/m$^2$ to 150 g/m$^2$.

6. The filter material of claim 1, wherein the coalescing layer substantially lacks bicomponent fibers.

7. The filter material of claim 1, wherein the particle filtration layer is hydrophilic in air.

8. The filter material of claim 1, wherein the particle filtration layer has a thickness of 0.25 mm to 1.9 mm.

9. The filter material of claim 1, wherein the particle filtration layer has a solidity of less than 15%.

10. The filter material of claim 9, wherein the compressibility of the particle filtration layer divided by the solidity is less than 4.

11. A filter material for use in fuel-water separation comprising:
    a particle filtration layer comprising binder fibers and glass fibers, wherein the binder fibers and glass fibers are at least 95% of the particle filtration layer by weight, wherein the particle filtration layer has an air permeability of at least 45 cfm/ft$^2$, and the particle filtration layer has a solidity of less than 15%;
    a coalescing layer downstream of the particle filtration layer and coupled to the particle filtration layer, the coalescing layer comprising acrylic resin and at least 90% glass fibers by weight, the coalescing layer has an air permeability of at least 10 cfm/ft$^2$; and
    a support layer downstream of the coalescing layer and coupled to the coalescing layer, wherein the filter material is configured to filter out particulates and coalesce free water in a fuel stream.

12. The filter material of claim 11, wherein the coalescing layer has an average fiber diameter of 0.3 μm to 10 μm.

13. The filter material of claim 11, wherein the particle filtration layer has an air permeability from about 45 cfm to about 200 cfm/ft$^2$ and the coalescing layer has an air permeability from 10 to about 70 cfm/ft$^2$.

14. The filter material of claim 11, wherein a ratio of the air permeability of the particle filtration layer to the coalescing layer ranges from about 3:1 to about 15:1.

15. The filter material of claim 11, wherein the coalescing layer has a basis weight from about 50 g/m$^2$ to 150 g/m$^2$.

16. The filter material of claim 11, wherein the coalescing layer substantially lacks bicomponent fibers.

17. The filter material of claim 11, wherein the particle filtration layer is hydrophobic in air.

18. The filter material of claim 11, wherein the particle filtration layer has a thickness of 0.25 mm to 1.9 mm.

19. The filter material of claim 11, wherein the particle filtration layer has a solidity of less than 10%.

20. A filter material for use in fuel-water separation comprising:
    a first particle filtration layer comprising binder fibers and glass fibers, wherein the binder fibers and glass fibers are at least 95% of the first particle filtration layer by weight, wherein the first particle filtration layer has an air permeability from about 45 cfm/ft$^2$ to about 200 cfm/ft$^2$;
    a second particle filtration layer downstream of the first particle filtration layer comprising binder fibers and glass fibers, wherein the second particle filtration layer has an air permeability that is lower than the air permeability of the first particle filtration layer;
    a coalescing layer downstream of the first particle filtration layer and coupled to the first particle filtration layer and the second particle filtration layer, the coalescing layer comprising acrylic resin and at least 85% glass fibers by weight, wherein the coalescing layer is at least 95% by weight of the glass fibers and the acrylic resin, the coalescing layer has an air permeability from about 10 cfm/ft$^2$ to about 40 cfm/ft$^2$; and
    a support layer downstream of the coalescing layer and the second particle filtration layer,
    wherein the filter material is configured to filter out particulates and coalesce free water in a fuel stream.

* * * * *